US006160792A

United States Patent [19]

Gadsby et al.

[11] Patent Number: 6,160,792

[45] Date of Patent: Dec. 12, 2000

[54] PULSE AMPLITUDE MODULATED TONE GENERATOR

[75] Inventors: Winston M. Gadsby, Herndon; Jeffery M. Davis, Manassas, both of Va.

[73] Assignee: Hubbell Incorporated, Orange, Conn.

[21] Appl. No.: 09/053,624

[22] Filed: Apr. 2, 1998

Related U.S. Application Data

[63] Continuation of application No. 08/580,023, Dec. 20, 1995.

[51] Int. Cl.[7] .......... H04J 7/00

[52] U.S. Cl. .......... 370/213; 370/525

[58] Field of Search .......... 370/212, 213, 370/303, 304, 308, 309, 503, 522, 525, 518, 532, 537, 540, 546; 340/825.2, 825.5, 825.65, 825.67, 825.77, 825.78; 341/158, 161

[56] References Cited

U.S. PATENT DOCUMENTS

| | | | |
|---|---|---|---|
| 4,178,480 | 12/1979 | Carbrey | 370/204 |
| 4,205,203 | 5/1980 | Mehta et al. | 370/110 |
| 4,383,313 | 5/1983 | Sbuelz | 370/51 |
| 4,432,031 | 2/1984 | Premerlani | 361/97 |
| 4,607,345 | 8/1986 | Mehta | 364/900 |
| 4,620,294 | 10/1986 | Leung et al. | 364/900 |
| 4,627,047 | 12/1986 | Pitroda et al. | 370/58 |
| 4,882,586 | 11/1989 | Dolph et al. | 341/169 |
| 4,907,222 | 3/1990 | Slavik | 370/443 |
| 4,967,195 | 10/1990 | Shipley | 340/825.52 |
| 5,281,756 | 1/1994 | Kawashima | 84/614 |
| 5,576,695 | 11/1996 | Minger et al. | 340/649 |

*Primary Examiner*—Chi H. Pham
*Assistant Examiner*—Kwang B. Yao
*Attorney, Agent, or Firm*—Jerry M. Presson; Stacey J. Longanecker

[57] ABSTRACT

A tone generating circuit comprises a counter circuit having a clock input for receiving a clock signal and a plurality of outputs which generate sequential binary values in response to transitioning of the clock signal; a multiplexer having several inputs, a number of select lines connected to the counter circuit outputs, and at least one output; and a resistor divider network connected to the multiplexer inputs. The multiplexer select lines select one of the multiplexer inputs in accordance with the binary value received from the counter circuit. The multiplexer inputs are connected to different taps on the resistor divider network. The counter selects multiplexer inputs on the falling edge of the clock signal, while the output signal level transitions before the rising edge of the clock signal.

3 Claims, 2 Drawing Sheets

+5V$_{REF}$
10
12
2154Ω 32
833.5Ω 30
1179Ω 28
833.5Ω 26
18
Y0 Y1 Y2 Y3 Y4 Y5 Y6 Y7
I/O 3 OUTPUT TO PAM BUS
INT 6
MULTIPLEXER
GND 8
$Y_{EE}$ 7
S1 S2 S3
11 10 9
14
3 4 5
Q1 Q2 Q3
16
COUNTER
7
CLK CLR 2
1
TFET
DIS

PULSE AMPLITUDE MODULATED TONE GENERATOR

This application is a continuation of U.S. application Ser. No. 08/580,023, filed Dec. 20, 1995, the entire subject matter of which is hereby incorporated herein by reference for all purposes.

FIELD OF THE INVENTION

The invention relates generally to a circuit for generating a pulse amplitude modulated tone.

BACKGROUND OF THE INVENTION

In T-1 digital carrier systems, a channel bank samples voice signals using pulse amplitude modulation. The channel bank subsequently converts the pulse amplitude modulated (PAM) signal to an eight bit encoded digital signal, interleaves the encoded signal with 23 other voice channels and transmits an output bit stream at 1.544 megabits per second over a line.

According to well known sampling theories, an analog waveform such as a voice signal can be digitally represented if samples are taken at least every 125 microseconds. Thus, the cyclic basis of sampling, multiplexing and de-multiplexing in many telecommunication switching systems uses a basic system clock rate of 8 kHz. Accordingly, voice channels in a channel bank are typically sampled 8,000 times per second or slightly more than twice the upper frequency limit of voice signals passable by most telecommunication switching systems (i.e., 4 kHz).

Channel banks typically comprise a number of line cards having voice and/or data ports for interfacing subscriber equipment with a digital network. Some line cards can include means for tone generation to simplify calibration and/or troubleshooting, or to indicate call processing states, for example. These line cards interface with a PAM bus. The PAM bus connects to a converter unit that converts PAM signals from the subscriber lines into pulse code modulated (PCM) voice signals for processing by the digital network.

Tone generation in a number of existing PAM bus interfaces such as channel bank line cards is subject to distortion, that is, the signals are conventionally generated using analog means, then processed two times. The analog-to-PAM conversion process generates some distortion to which more distortion is added during PAM-to-digital conversion. Thus, the quality of the sine wave created using the sampled signal degrades.

A need exists for a circuit which generates a 1 kHz tone having a sampling rate of 8,000 samples per second or eight samples per cycle at a low cost.

SUMMARY OF THE INVENTION

In accordance with an embodiment of the present invention, a tone generating circuit is provided for generating a 1 kHz tone for transmission on a PAM bus. The tone generating circuit uses an 8 kHz system clock to generate switched analog signal levels at an 8 kHz sampling rate.

In accordance with another aspect of the present invention, the tone generating circuit generates analog signal levels using four different voltages and switches the analog signals to create an eight sample sine wave.

In accordance with another aspect of the present invention, the tone generating circuit coordinates sampling times with the transitioning of the analog output signal. For example, the circuit generates analog signal levels for output onto a PAM bus on the falling edges of the system clock, while the switched analog output signals are sampled on the rising edges of the clock. Alternatively, the analog signal levels can be generated on the rising edges of the system clock and applied to the PAM bus on the falling edges of the system clock.

A tone generating circuit constructed in accordance with an embodiment of the present invention comprises a counter circuit having a clock input for receiving a clock signal and a plurality of outputs which generate sequential binary values in response to transitioning of the clock signal; a multiplexer having a plurality of inputs, a number of select lines connected to the counter circuit outputs, at least one output and a resistor divider network connected to the multiplexer inputs. The multiplexer select lines select one of the multiplexer inputs in accordance with the binary value received from the counter circuit. The multiplexer inputs are connected to different taps on the resistor divider network. Accordingly, the multiplexer output signal level depends on which input is selected and to which tap the multiplexer input is connected on the resistor divider network.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENT

Figure 1:
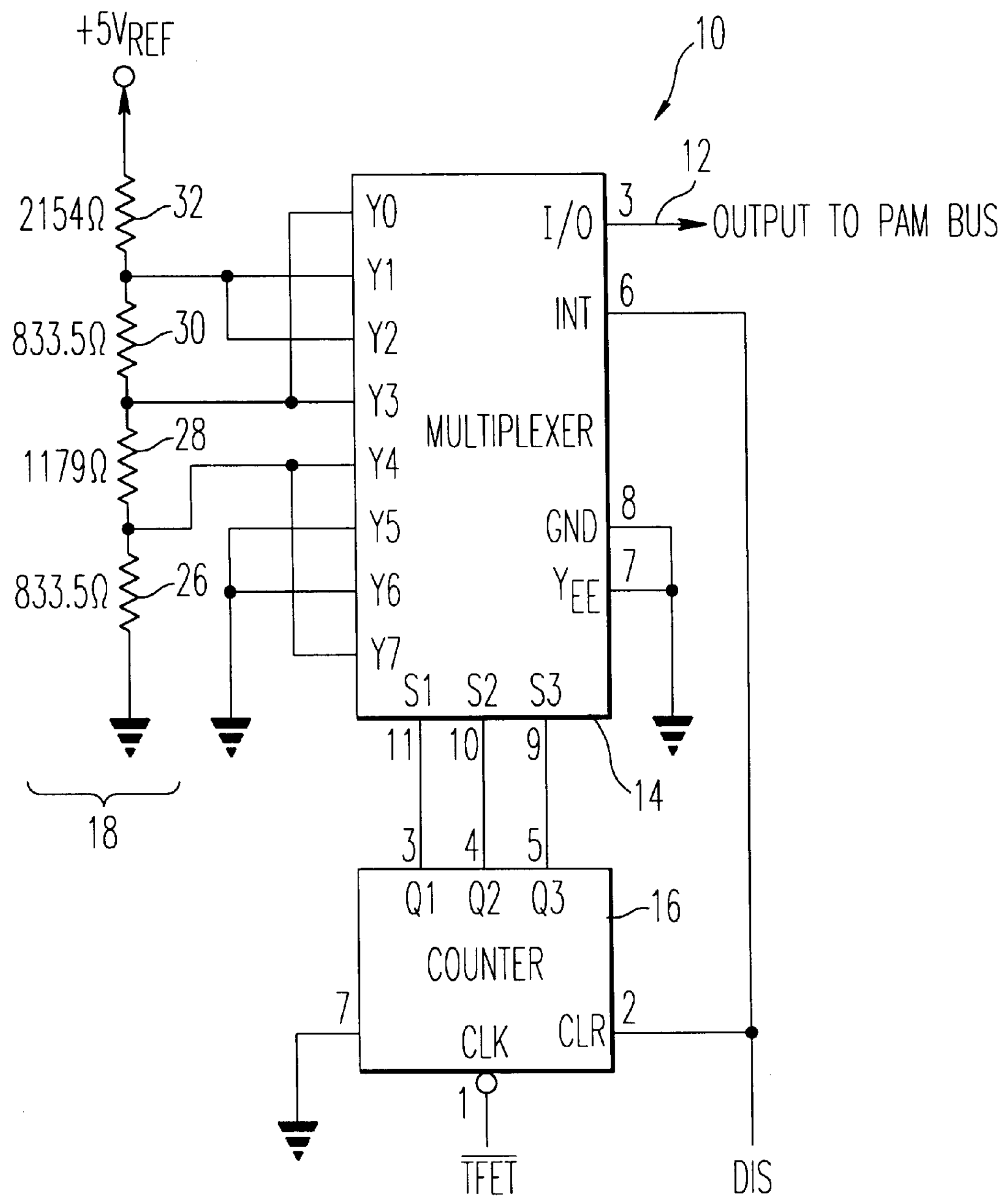
FIG. 1 is a schematic diagram of a tone generating circuit constructed in accordance with an embodiment of the present invention.

With reference to FIG. 1, a tone generating circuit 10 is shown which produces discrete voltage samples representing a sine wave at its output 12. The tone generating circuit 10 preferably comprises an 8-to-1 analog multiplexer 14 (e.g., a model 74HC4051 multiplexer manufactured by National Semiconductor, Santa Clara, Calif. The multiplexer 14 comprises eight inputs $Y_0$–$Y_7$, one of which is connected to the single output 12 depending on the current state of each of three select lines $S_1$–$S_3$. The select lines $S_1$–$S_3$ are connected to a 4-bit synchronous counter device 16 (e.g., a model 74HC393 counter manufactured by National Semiconductor, Santa Clara, Calif. Three of the four counter outputs $Q_1$–$Q_3$ are used to generate eight binary states and are connected to the three select lines $S_1$–$S_3$ of the multiplexer 14. Upon application of an inverted system clock signal (e.g., an 8 kHz signal TFET, the counter 16 commences sequentially generating the eight binary states. The application of to each of these states at the select lines $S_1$–$S_3$ causes the multiplexer to supply the voltage at the corresponding one of the inputs $Y_0$–$Y_7$ to the output 12. The voltage on each of the eight inputs $Y_0$–$Y_7$, of the multiplexer 14 is determined by a resistor divider network 18, which provides four different voltages including ground to the multiplexer 14.

Figure 2:
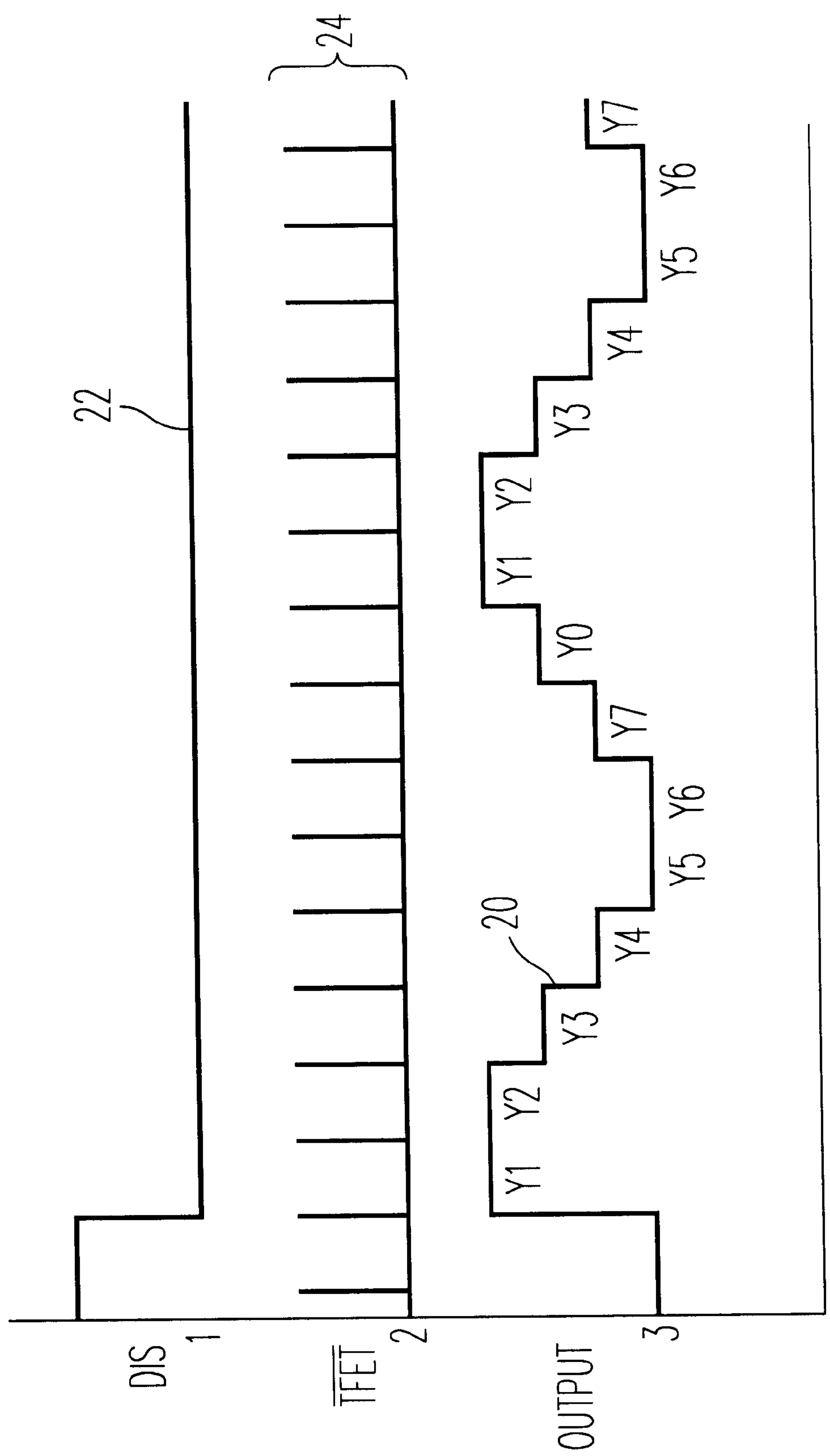
FIG. 2 is a graph illustrating an output waveform generated by the tone generating circuit depicted in FIG. 1, along with disable (DIS) and system clock (TFET) waveforms.

The resistor divider network 18 values are selected by calculating the voltages required for eight, equally spaced in time, sampled points on a sine wave. By routing the proper voltages from the resistor divider network 18 through the multiplexer output 12 at the proper time intervals, an eight sample waveform of four different voltages is produced to represent a sine wave 20, as shown in FIG. 2. With reference to FIG. 2, a disable (DIS) signal 22 can be generated by a microcontroller (not shown) in a channel bank for application to both the counter 16 and the multiplexer 14. When the DIS signal is low, the multiplexer 14 begins to generate an output signal, as indicated generally by 22 in FIG. 2. Upon each transition of the clock signal TFET 24, the multiplexer 14 generates another output signal level, depending on which multiplexer input was selected.

In the illustrative circuit shown in FIG. 1, the resistor network comprises an 833.5 ohm resistor 26, a 1179 ohm resistor 28, an 833.5 ohm resistor 30 and a 2154 ohm resistor 32 connected in series. The resistors 26–32 operate as a voltage divider with an input voltage of 5 volts. The inputs $Y_5$ and $Y_6$ are connected to ground and produce a zero volt output signal. Multiplexer inputs $Y_7$ and $Y_4$ receive a 0.8335 volt output signal. Multiplexer inputs $Y_3$ and $Y_0$ receive a 2.0125 volt output signal. Multiplexer inputs $Y_1$ and $Y_2$ require a 2.846 volt output signal. The selected inputs and their corresponding signal levels are shown in FIG. 2. The output signal voltage levels are positive voltages in the present example. Output signal voltage levels, however, can be negative or can be ground-centered with the addition of an output capacitor and resistor at pin 3 of the multiplexer.

The sampled output signal 20 is suitable for application to a PAM bus. By using a multiplexer in accordance with the present invention, the sampling and signal output times are coordinated, that is, multiplexer output 12 cannot transition during the sampling times (i.e., when the inputs $Y_0$–$Y_7$ are selected). The counter preferably changes state on the falling edges of the clock signal TFET. The counter in turn provides a binary value (e.g., a value between 000 and 111) to the select lines $S_1$–$S_3$ of the multiplexer. By virtue of the multiplexer timing characteristics, the output signal 12 transitions to a new voltage level corresponding to the selected input $Y_0$–$Y_7$ before the rising edge of the clock signal. Alternatively, another type of counter can be used which changes states on the rising edges of the clock signal, while the output 12 signal level transitions on the falling edges of the clock signal. The output signal, therefore, transitions each clock cycle to create an eight sample, 1 kHz sine wave consisting of four different voltage levels. Thus, the four voltage levels can be applied to the bus approximately 2,000 times per second. The tone levels remain accurate and the integrity of the sine wave tone signal is maintained by virtue of the dependence of the multiplexer on the counter for selecting inputs, and the operation of the counter using a system clock.

While certain advantageous embodiments have been chosen to illustrate the invention, it will be understood by those skilled in the art that various changes and modifications can be made herein without departing from the scope of the invention as defined in the appended claims.

What is claimed is:

1. A method of generating a pulse amplitude modulated tone comprising the steps of:

generating a plurality of predetermined voltage levels using a voltage divider circuit;

selecting different ones of said plurality of predetermined voltage levels for output to a pulse amplitude modulated bus, each of said plurality of predetermined voltage levels being selected on one of a falling edge and a rising edge of a clock signal; and applying respective said selected ones of said plurality of predetermined voltage levels to said pulse amplitude modulated bus substantially coincidentally with one of said rising edge and said falling edge, respectively, of said clock signal and substantially periodically to approximate at least one half-cycle of a sine wave.

2. A tone generating method as claimed in claim 1, wherein said plurality of predetermined voltage levels is comprised of eight voltage levels, and said applying step comprises the step of applying each one of said eight voltage levels sequentially to said bus at least approximately 1000 times per second, said sine wave having a frequency of at least approximately 1000 hertz.

3. A tone generating method as claimed in claim 1, wherein said plurality of predetermined voltage levels is comprised of four voltage levels, and said applying step comprises the step of applying each one of said four voltage levels to said bus at least approximately 2000 times per second, said sine wave having a frequency of at least approximately 1000 hertz.

* * * * *